United States Patent [19]

George et al.

[11] Patent Number: 4,591,516

[45] Date of Patent: May 27, 1986

[54] INORGANIC BINDER COMPOSITION AND REFRACTORY-BINDER COATED FABRIC COMPOSITIONS PREPARED THEREFROM

[75] Inventors: Stephen George; Thomas H. George, both of Clinton, N.J.

[73] Assignee: Subtex, Inc., New York, N.Y.

[21] Appl. No.: 688,693

[22] Filed: Jan. 4, 1985

Related U.S. Application Data

[62] Division of Ser. No. 585,909, Mar. 2, 1984, Pat. No. 4,507,355.

[51] Int. Cl.$^4$ ............................................. B05D 3/02
[52] U.S. Cl. ................................. 427/375; 427/387; 427/389.7; 427/389.8; 427/389.9
[58] Field of Search ...................... 501/133; 428/246; 427/387, 389.7, 389.8, 389.9, 375

[56] References Cited

U.S. PATENT DOCUMENTS

| | | | |
|---|---|---|---|
| 4,282,165 | 8/1981 | Liauw | 260/429.7 |
| 4,358,500 | 11/1982 | George et al. | 428/246 |
| 4,375,493 | 3/1983 | George et al. | 428/246 |
| 4,396,661 | 8/1983 | George et al. | 428/246 |
| 4,428,999 | 1/1984 | George et al. | 428/246 |

*Primary Examiner*—Theodore Morris
*Attorney, Agent, or Firm*—Scully, Scott, Murphy and Presser

[57] ABSTRACT

An inorganic binder usefully employed in providing refractory coatings on fabric substrates is prepared from colloidal silica, monoaluminum phosphate, aluminum chlorohydrate and a catalyst of an alkyl tin halide.

3 Claims, No Drawings

INORGANIC BINDER COMPOSITION AND REFRACTORY-BINDER COATED FABRIC COMPOSITIONS PREPARED THEREFROM

This is a divisional of co-pending application Ser. No. 585,909 filed Mar. 2, 1984, now U.S. Pat. No. 4,507,355.

BACKGROUND OF THE INVENTION

1. Field of the Invention

This invention relates to refractory-binder coated compositions. More particularly, it relates to an inorganic binder composition which may usefully be employed, in combination with refractory materials, in preparing refractory-binder coated compositions. This invention is especially related to refractory-binder compositions which may be applied to woven, knitted or non-woven fabrics constructed from textile yarns to provide them with high temperature resistance and flame resistance.

2. Description of the Prior Art

Ceramics and/or glass fibers have been used herebefore to prepare high temperature electrical insulating tape. U.S. Pat. No. 4,358,500 discloses refractory coated insulating compositions wherein the refractory coating, comprising refractory materials and an inorganic bonding agent, is formed on the surface and, necessarily, the interstices of a porous base fabric, such as a knitted fiberglass fabric. In the presence of extreme temperatures and heat, the refractory materials fuse into the softened surface of the base fabric, enabling it to withstand intense heat, flame impingement, flame abrasion, and elevated temperatures well beyond the normal temperature limitations of the fabric. The resulting fabric structure will have ceramic qualities and will not soften, melt, drip or lose its insulating properties.

Commonly assigned patent application Ser. No. 338,850 and U.S. Pat. Nos. 4,375,493 and 4,396,661 relate to multi-functional fabric compositions having a refractory coating on one side of the base fabric and a different coating providing a different function on the other side, i.e., the application Ser. No. 338,850—a vapor barrier coating, the U.S. Pat. No. 4,375,493—a conductive coating and the U.S. Pat. No. 4,396,661—a dielectric coating.

The inorganic bonding agent disclosed in U.S. Pat. No. 4,358,500 is prepared from colloidal silica, monoaluminum phosphate (MAP) and aluminum chlorohydrate (ACH) by adding the MAP and ACH separately to the colloidal silica which acts as a liquid moderator. Although the compositions containing the inorganic bonding agent of U.S. Pat. No. 4,358,500 may be exposed to high temperatures, no products of combustion in the form of smoke or fumes are produced as with other prior art coated fabrics. Further, the refractory coated compositions prepared with the inorganic bonding agent proved superior to inorganic coatings available for use on fabrics or paper substrates. The latter inorganic coatings could be damaged by water. They could be wet by water and the water could solvate the coating to the point of causing the inorganic coating to dissociate itself from the substrate. Although other binders, such as the acrylics, inhibited this wetting action, they would burn off when subjected to flame and high temperature. The refractory coated substrates disclosed in the U.S. Pat. No. 4,358,500, on the other hand, are not wetted by water and are not subject to the solvation action of water as are other inorganic coatings. However, despite these advantages, the refractory coated compositions of the U.S. Pat. No. 4,358,500 exhibit a very undesirable feature. This refractory coating must be applied to a porous fabric so that the coating will be placed in the interstices of the fabric. This is necessary to achieve the formation of the refractory coating on this fabric. However, this requires the use of a larger quantity of the refractory coating when preparing these compositions to the extent that the coating in many instances constitutes about 50% of the overall weight of the impregnated base fabric. The result of all this is that when this coated fabric is flexed, the bond of the refractory coating to the substrate is disrupted and some particles may be released to the surface resulting in "dusting" of the coating. This, of course, is highly undesirable despite the very desirable features of flame and high temperature resistance which are exhibited by these refractory coated compositions.

It is an object of this invention to provide an improved inorganic bonding agent (binder) which may be usefully employed in preparing refractory-binder coated compositions and which will provide an intimate bond between the refractory coating and the fibrous surface of the yarn comprising the fabric so that the coating will not dissociate itself from the fiber upon flexure of the coated composition.

It is another object of this invention to provide refractory coated fabric compositions which will not exhibit "dusting" of the refractory coating in use.

SUMMARY OF THE INVENTION

These and other objects of this invention have been achieved by preparing an inorganic bonding agent from colloidal silica, monoaluminum phosphate, aluminum chlorohydrate and an organic tin halide catalyst. This bonding agent is combined with refractory material and applied to base fabrics to provide refractory-binder coated compositions which do not "dust" as heretofore and which have flame and high temperature resistance. This inorganic binder composition is an improvement over the bonding agent disclosed in U.S. Pat. No. 4,358,500 and leads to the use of substantially lower coating weights while providing the same water shedding properties and the same flame and fire protection as the refractory coated compositions disclosed therein. Further, the significantly improved bonding does not require that the coating has to be placed in the interstices of the fabric and, hence, the base fabrics employed herein need not be porous.

The present invention relates to an inorganic binder composition comprising:

(a) colloidal silica;

(b) monoaluminum phosphate;

(c) aluminum chlorohydrate; and (d) an amount of an alkyl tin halide catalyst effective to increase the bonding of said composition when applied to a substrate.

In a preferred embodiment, the present invention relates to a heat resistant, refractory coated composition comprising:

(a) a base fabric, and (b) a refractory coating comprising refractory materials and the above inorganic binder composition, said refractory coating bonded to the surface of the fabric and said refractory materials being capable of providing flame abrasion resistance and heat resistance to the base fabric at elevated temperatures.

DESCRIPTION OF THE PREFERRED EMBODIMENTS

The present invention is an improvement of the heat resistant, refractory, insulating fabric compositions of U.S. Pat. No. 4,358,500, the entire contents of which are incorporated herein by reference. The terms binder and bonding agent are used interchangeably herein to describe compositions having the same utility. Thus, the inorganic composition of U.S. Pat. No. 4,358,500 is described therein as a bonding agent while the inorganic composition of the present invention which is an improvement of the bonding agent of U.S. Pat. No. 4,358,500 is described herein as a binder. Both compositions, when combined with refractory materials and applied to an acceptable substrate, will "bond" or "bind" these materials to the substrate, although not to the same degree.

Briefly, the inorganic binder of the present invention comprises the three components of the prior art bonding agent to which is added a catalyst which promotes the curing of the binder when it is applied to an appropriate surface and increases the bond between this surface and the binder composition. The preferred catalyst is an organometallic halide, specifically, a lower alkyl tin halide. The alkyl tin halide catalyst is preferably a trialkyl tin chloride, most preferably, a tri-butyl tin chloride and especially, triisobutyl tin chloride. A particularly preferred catalyst which may be employed in the binder of this invention is a product of Dow Corning Corporation, Midland, Mich. known as Dow Corning catalyst 182A, wherein the active ingredient is triisobutyl tin chloride.

When practicing this invention the refractory coating which is applied to the appropriate fabric substrate comprises heat resistant refractory materials intermixed or dispersed in the binder. The refractory materials may be any of the usual known refractory materials in finely divided form and include compounds of aluminum, calcium, chromium, magnesium, silicon, titanium, zirconium and the like, such as aluminum oxide, calcium oxide, magnesium oxide, silicon oxide, titanium oxide, zirconium oxide, aluminum silicate, calcium silicate, magnesium silicate, silcon carbide, zirconium carbide and the like. Alumina, zirconia, calcium silicate and silicon dioxide are preferred, alone or in combination. These materials enable the compositions of this invention to maintain their heat insulating ability after prolonged exposure to temperatures in the 2200° F. range.

In addition to these ceramic-type materials, other useful refractory materials may be employed to provide compositions which may be employed at temperatures in the 3000° F. plus range. These refractory materials include, for example, zirconium oxide, silicon carbide, alumina-silica fiber, carbon fiber, zirconia fiber, graphite and thermal carbon black. This later material is a non-electrical conducting form of carbon black which is resistant to temperatures as high as 7000° F.

The all inorganic composition of this invention is employed as the binder composition, i.e., the bonding agent for the refractory materials in the refractory coating. The refractory coating is applied to the base fabric and then subjected to a source of heat to remove water from the coating and to initiate the catalytic action which causes an increased bonding of the refractory material to the surface of the fabric. This provides the fabric composition with a coating which will permit use at high temperatures and will resist direct flame abrasion and will not dust.

The inorganic composition of this invention is liquid and is formed from colloidal silica, the catalyst, monoaluminum phosphate and aluminum chlorohydrate. The later two materials cannot normally be employed in combination since when they are combined the result is highly exothermic, producing a pliable mass which develops into a solid material. By employing the colloidal silica, which acts as a liquid moderator, the monoaluminum phosphate (MAP) and the aluminum chlorohydrate (ACH) may be used in combination to achieve the desired results. The catalyst further promotes the reaction and achieves an improved bonding between the binder and the fabric substrate.

In formulating the inorganic composition employed in this invention, the quantities of the components may be varied over a considerable range. It is usually convenient to provide the monoaluminum phosphate and the aluminum chlorohydrate in a weight ratio of MAP to ACH of about 0.8:1.0 to about 1.5:1.0, preferably about 1.0:1.0 to about 1.25:1.0. The quantity of colloidal silica to be employed is based on the weight ratio of the liquid colloidal silica to the combined weights of the MAP and the ACH. A weight ratio range of colloidal silica to MAP plus ACH of about 0.6:1 to about 1:1, preferably about 0.75:1 to about 0.85:1 has been found useful. The quantity of catalyst to be employed is based on the weight ratio of the liquid catalyst to the combined weights of the MAP, the ACH and the colloidal silica. A weight ratio range of catalyst to MAP, ACH and colloidal silica of about 0.025:1.0 to about 0.125:1.0, preferably about 0.06:1 to about 0.08:1.0 has been found useful. Preferably, the binder composition should be applied as a coating in a dilute concentration by adding a quantity of water to the combined ingredients. A ratio of the combination of MAP, ACH and colloidal silica to water of about 0.5:1.0 to about 1.0:1.0 can be effective employed. The water employed should be soft or at least deionized to achieve best results. Additional water may be used as a diluent in various coating techniques without deleterious effects.

Since the catalyst promotes the reaction of the components, the binder composition has a definite pot time, usually about 2 to about 3 or more hours. In general, the more water added to the mixture, the longer the pot time.

In preparing this inorganic binder, the required amounts of MAP and ACH are separately added to the colloidal silica. The catalyst, the refractory materials and the necessary amount of water are added to complete the formulation of the refractory coating. This coating may be applied to the fabric substrate and maintained at an elevated temperature for a period of time sufficient to cause removal of the water and permit the MAP and the ACH, in the presence of the catalyst, to react slowly producing a slowly thickening material which bonds the refractory materials to the surface of the fabric substrate and providing a unitary structure having flame and high temperature resistant properties and an inorganic coating which is not water soluble.

When the refractory coating has been bonded to the fabric substrate, the resulting coating has an acid pH which should be neutralized or the chemical bonding action will continue slowly over a period of time causing the underlying fabric to lose some degree of flexibility. This acidity may be neutralized by a dilute alkali solution of ammonia, caustic and the like. The solution may be sprayed onto the coated fabric or the fabric may be passed through a bath of the dilute alkali solution. Following the neutralization, the coated fabric can be air dried or slowly dried in streams of warm air. Where loss of fabric flexibility creates no particular problem, the neutralization step can be eliminated.

The surface of the refractory coated fabric composition prepared in accordance with this invention may appear to be slightly abrasive, principaly because of the presence of refractory materials, even though they are in finely divided form. To remove this abrasiveness and to improve the flexibility and the "hand" of the coated fabric, a silicone elastomer coating may be applied to the refractory coating. A coating of a silicone elastomer can be formed on the coated fabric by applying a one-component, water based emulsion of a silicone elastomer, such as a product known as Dow Corning Q3-5025. This one-component silicone material is cured by simple evaporation of water at room temperature. The evaporation of water may be accelerated at elevated temperatures. The water based silicone elastomer emulsion provides a desirable side effect since it neutralizes the acid pH of the refractory coating. Thus, when a silicone rubber coating is applied to the compositions of this invention, there is no need to employ the dilute alkali neutralization described above. The resulting silicone rubber coated fabric is smooth to the touch and is easily handled. The silicone coating provides a very flexible product since not only does it stop the catalyzed reaction and the further hardening of the coating, but it lubricates the surfaces of the refractory coated fabric so that these surfaces can rub together with less friction and add flexibility to the fabric composition.

The refractory coating prepared in accordance with this invention may be applied to a wide variety of fabric substrates and will achieve a good bond even if the fabric has a smooth surface. The binder may be employed as the only binder in the resulting composition or it may be combined with any known binder conventionally employed with the subject substrate to provide the resulting composition with flame and heat resistant properties. Those skilled in the art will appreciate that the dissimilar binder which is combined with the refractory coating which contains the binder of this invention must be compatible with the latter binder. That is, the combination of binders must not produce any undesirable side effects or reactions.

The base fabrics which form the substrate for the compositions of this embodiment may be composed of a wide range of materials including natural or synthetic materials or mixtures thereof. Thus, fabrics containing such natural materials as cotton, silk, wool, and the like and such man-made and polymeric materials as glass, mineral wool, nylon, dacron, aramid, and the like, alone or in combination may be employed.

Although the refractory coating containing the inorganic binder of this invention will provide high temperature properties to the base fabric, it will not render combustible material in the fabric non-combustible. However, any non-combustible fabric or any combustible fabric which can be rendered fireproof will have its flame resistance increased to a higher threshold when the refractory coating prepared in accordance with this invention is applied to such fabric. Phosphate treatment of cellulosic material and similar treatments known in the art for other combustible materials will render these materials flameproof.

As used herein, the term "fabric" includes materials which are woven, knitted or non-woven. Non-woven fabrics herein include an assembly of textile fibers held together by mechanical interlocking in a web or mat by such procedures as needle punching, by fusing of the fibers or by bonding with a cementing medium. In most instances, the "fabrics" employed herein will be constructed from interlocking yarns, fibers or filaments.

The base fabric employed in the prior art refractory coated compositions had to have a porosity, i.e., there had to be an openness to the texture of the fabric so as to permit the refractory coating to impregnate the surface of the fabric and fill, at least partially, some, if not all, of the interstices of the porous fabric. In contradistinction, the fabrics employed in the present invention need not have the porosity which is required in the prior art when preparing refractory coated fabrics. The refractory coating prepared with the inorganic binder of this invention will bond to the surface of the fabric wherever exposed and it will even bond to a fabric having a smooth, as opposed to an irregular, surface. There is no need in the present invention for the refractory coating to be located in the interstices of a fabric to achieve a coating of the fabric as is required when preparing refractory coated compositions such as those of U.S. Pat. No. 4,358,500.

A fabric preferred in this invention is one composed of fiberglass. This substrate may be woven fiberglass, knitted fiberglass or a non-woven web of fiberglass.

As will be understood by those skilled in the art, a fiberglass substrate fabric, though it may be formed of all fiberglass yarns, may also be constructed of combinations of fiberglass yarn with other fire resistant yarns.

The following serves to illustrate the subject invention. An inorganic composition usefully employed in this invention contains the following ingredients, listed in their order of addition:

TABLE I

| | Parts (By Weight) |
|---|---|
| Water | 16 |
| Colloidal Silica (Nyacol 2034 DI) (34% Solids) | 30 |
| Monoaluminum Phosphate (MAP) (42% Solids) | 20 |
| Aluminum Chlorohydrate (Cawoods-5025) (32% solids) | 20 |
| Catalyst (Dow Corning catalyst 182A) (21% solids) | 5 |
| Water | 48 |

The liquid inorganic composition is formed by slow addition of MAP to the mixture of water and colloidal silica while mixing, followed by the slow addition of the ACH while mixing. Mixing should be continued while the catalyst is added and is continued until a slight increase in viscosity occurs and a smooth consistency is achieved. The colloidal silica and the water acts as a moderator to delay the rapid exothermal chemical reaction that would normally occur when MAP is mixed with ACH. Although the rapid chemical reaction between the MAP and ACH is greatly slowed by the colloidal silica and water moderator, a partial reaction does occur which is the cause of the initial viscosity increase when ACH is added to the mixture. After the catalytic action starts, the final addition of water is made. The catalyst further promotes the reaction which causes the binder, together with the refractory materials, to become bound to the substrate to which it has been applied.

The refractory coating of this invention can be formed as a thin coating on the base fabric. This is in contrast to the refractory coated fabric compositions of U.S. Pat. No. 4,358,500 where the coating constituted about 50% of the overall weight of the coated fabric. In the coated fabrics of the present invention, the refractory coating may constitute as little as 10 to 20% of the total weight of the coated fabric. It is the increased bonding achieved with the present inorganic binder which makes this possible.

A high temperature refractory coating may be formed by adding high temperature refractory materials to the liquid inorganic composition and mixing to a smooth consistency. Refractory materials, alone or in combination, for example, zirconium oxide, alumina-silica fiber, carbon fiber, zirconia fiber, graphite or thermal carbon black and the like, may be employed. One particularly preferred refractory coating comprises the above binder plus refractory materials of alumina-silica fiber and zirconium oxide. In forming this coating, the refractory materials are preferably added after the MAP but before the ACH. This preferred refractory coating has the composition set forth in Table II where the ingredients are listed in the order of their addition. As prepared, this coating has a solids composition of 30.7%.

TABLE II

| | Parts (By Weight) |
|---|---|
| Water | 16 |
| Colloidal Silica (Nyacol 2034 DI) (34% Solids) | 30 |
| Monoaluminum Phosphate (MAP) (42% Solids) | 20 |
| Alumina Silica Fiber (Fiberfax) | 24 |
| Zirconium Oxide (Tam Zirox 250) | 8 |
| Aluminum Chlorohydrate (Cawoods-5025) (32% solids) | 20 |
| Catalyst (Dow Corning catalyst 182A) (21% solids) | 5 |
| Water | 48 |

The binder composition employed in this invention may be employed alone as a single bonding agent or binder or, alternatively, the binder may be employed in combination with any of the commercial binders, often organic, that are conventionally employed in preparing certain fabric compositions. The relative amounts of conventional, i.e., dissimilar, binder and the inorganic binder composition of this invention will be dependent on factors, inter alia, such as compatibility of the two binders, and the mechanical integrity required for the service in which the fabric composition product will be placed.

Curing the inorganic composition, after it is applied to the porous base fabric as part of the refractory coating may be achieved by any of a number of procedures. Fabric temperatures of about 250° F. are usually effective, although lower or higher temperatures may be employed, where required. An infrared source of heat has been found effective. Equally useful is a stream of forced dry air. Passing the coated fabric through a drying oven in a continuous fashion is an effective drying technique where the composition is being prepared in a continuous operation. The water is removed first and during the course of this, the curing is initiated and is effected by the time the coating is dry.

The dried refractory coating may impart a stiffness to the finished fabric composition. Where this stiffness is undesired, it is possible to retain flexibility of the fabric composition by neutralizing the pH of the coating with a dilute alkali solution or a water based emulsion of a silicone rubber as described above.

The practice of the subject invention is illustrated in the following example.

A refractory coated fiberglass fabric was prepared as follows:

The ingredients of the binder composition were those of Table I and the refractory material consisted of alumina-silica fiber. The refractory coating had the composition shown in Table III, where the ingredients are listed in their order of addition.

TABLE III

| | Parts (By Weight) |
|---|---|
| Water | 32 |
| Colloidal Silica (Nyacol 2034 DI) (34% Solids) | 60 |
| Monoaluminum Phosphate (MAP) (42% Solids) | 40 |
| Alumina-Silica Fiber (Fiberfax) (Ball Milled) | 48 |
| Aluminum Chlorohydrate (Cawoods 5025) (32% Solids) | 40 |
| Catalyst (Dow Corning catalyst 182A) (21% Solids) | 10 |
| Water | 96 |
| TOTAL | 326 |

This coating, which did not contain any zirconium oxide employed in the preferred composition of Table III, has a lower heat resistance than the preferred composition.

Water and colloidal silica were mixed together. While this mixture was continuously being mixed, the remaining ingredients were slowly added thereto. Each ingredient was thoroughly mixed into the mixture before the next ingredient was added. After the final addition of water, the mixing was continued until the inorganic mixture was homogenous and smooth.

A piece of woven fiberglass cloth (DE-150-1/0 by DE-150-1/0) was placed in the bottom of a shallow flat bottom tray and the above liquid inorganic mixture was poured over the cloth. The mixture was worked into the surface of the glass cloth until all surfaces were thoroughly wetted. The cloth was then placed on a flat surface and excess quantities of the mixture were removed with a doctor blade. The wetted cloth was then placed under a set of infrared lamps until the coated cloth was dry. The product obtained had a refractory coating which provided a slightly roughed surface to the cloth and exhibited an acid pH.

A coating of a one-component water based silicone elastomer emulsion was applied to the surface of the cloth. This emulsion consisted of 40 parts of Dow Corning Water Based Silicone Elastomer Q3-5025 and 240 parts of water. The wetted cloth was again placed under the infrared lamps until the surface of the cloth was dry. The surface was now smooth and the cloth had improved flexibility and "hand".

A strip of the coated fiberglass and a strip of the uncoated fiberglass were each suspended in a chamber. The flame of a propane torch was held against each sample. A hole immediately appeared in the uncoated fiberglass cloth. The refractory coated fiberglass, on the other hand, resisted the flame abrasion for 20–30 seconds. During this time, the surface of the cloth became discolored indicating the removal of the silicone elastomer. The fiberglass at the point of flame impact appeared to soften with the refractory materials melting into it. After this occurred, the refractory coating caused the fabric to harden with a ceramic surface which was highly fire retardant and resisted flame abrasion for relatively long periods.

A strip of knitted fiberglass was coated with a refractory coting similar to that of Table III except that it did not contain any of the catalyst. After being dried, the strip of refractory coated knitted fiberglass composition was compared to a strip of the refractory coated woven fiberglass of the invention.

|  | Knitted Fiberglass Composition (Prior Art) | Woven Fiberglass Composition (Invention) |
| --- | --- | --- |
| Coating weight, % of coated fabric | 50 | 10 |
| Effect of repeated flexing | Visible dusting of surface | No visible dusting of surface |

What is claimed is:

1. A method of preparing a heat resistant refractory coated fabric composition comprising:
   (a) coating the surface of a base fabric with a heat resistant refractory coating comprising refractory materials and an inorganic binder composition comprising
      (i) colloidal silica,
      (ii) monoaluminum phosphate
      (iii) aluminum chlorohydrate, and
      (iv) an amount of an alkyl tin halide catalyst effective to increase the bonding of said composition when applied to a substrate, and
   (b) heating the refractory coating for a period of time effective to provide the fabric with a dry refractory coating.

2. A method of preparing a heat resistant refractory coated fabric composition having a silicone rubber coating formed thereon which comprises the method of claim 1, plus the following additional steps:
   (e) applying a one-component, water based emulsion of silicone elastomer to the refractory coating, and
   (f) curing the silicone elastomer to form a silicone elastomer coating on the refractory coating.

3. A method according to claim 1 including the following additional steps:
   (c) applying a dilute alkali solution to the refractory coating; and
   (d) drying the refractory coating.

* * * * *